(12) United States Patent
Omi

(10) Patent No.: US 11,469,951 B2
(45) Date of Patent: Oct. 11, 2022

(54) NETWORK-CONFIGURATION-INFORMATION GENERATION METHOD AND COMMUNICATION DEVICE

(71) Applicant: Mitsubishi Electric Corporation, Tokyo (JP)

(72) Inventor: Hiroaki Omi, Nagoya (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 265 days.

(21) Appl. No.: 16/479,609

(22) PCT Filed: Mar. 29, 2017

(86) PCT No.: PCT/JP2017/012852
§ 371 (c)(1),
(2) Date: Jul. 22, 2019

(87) PCT Pub. No.: WO2018/179125
PCT Pub. Date: Oct. 4, 2018

(65) Prior Publication Data
US 2021/0336852 A1    Oct. 28, 2021

(51) Int. Cl.
*H04L 41/0853*    (2022.01)
*H04L 12/40*    (2006.01)
*H04L 41/0803*    (2022.01)

(52) U.S. Cl.
CPC .......... *H04L 41/0853* (2013.01); *H04L 12/40* (2013.01); *H04L 41/0803* (2013.01)

(58) Field of Classification Search
CPC . H04L 67/34; H04L 41/0813; H04L 61/3065; H04L 41/0853; H04L 12/28
See application file for complete search history.

(56) References Cited

U.S. PATENT DOCUMENTS

| 7,058,024 B1 * | 6/2006 | Koay .................. H04L 45/02 370/255 |
| 8,406,903 B2 | 3/2013 | Mitamura et al. |

(Continued)

FOREIGN PATENT DOCUMENTS

| JP | 04-032905 A | 2/1992 |
| JP | 2000-236347 A | 8/2000 |

(Continued)

OTHER PUBLICATIONS

Office Action dated Dec. 31, 2020, in corresponding Indian patent Application No. 201927028428, 6 pages.

(Continued)

*Primary Examiner* — Mahran Y Abu Roumi
(74) *Attorney, Agent, or Firm* — Xsensus LLP

(57) ABSTRACT

A network-configuration-information generation method generates information indicating a network configuration of a network system defined by a plurality of communication devices and a plurality of networks. The method includes: a step in which at least one of the communication devices generates and stores network-configuration information defined as a pair of a network name of a network to which the at least one communication device belongs and a network name of a network adjacent to the network to which the at least one communication device belongs; and steps in which when each communication device receives, from another communication device, the network-configuration information stored in the other communication device, each communication device stores the received network-configuration information.

16 Claims, 4 Drawing Sheets

(56) References Cited

U.S. PATENT DOCUMENTS

| | | |
|---|---|---|
| 9,049,097 B2 | 6/2015 | Nakamura et al. |
| 9,350,626 B2 | 5/2016 | Nakamura et al. |
| 2006/0274774 A1* | 12/2006 | Srinivasan .......... H04L 41/0809 370/420 |
| 2007/0274224 A1* | 11/2007 | Suzuki ............... H04Q 11/0062 370/248 |
| 2010/0214951 A1* | 8/2010 | Takemura .......... H04L 41/0853 370/254 |
| 2014/0156820 A1* | 6/2014 | Moineau ............ H04L 41/0813 709/223 |

FOREIGN PATENT DOCUMENTS

| | | |
|---|---|---|
| JP | 2000-267710 A | 9/2000 |
| JP | 2012-15897 A | 1/2012 |
| TW | 201228297 A1 | 7/2012 |
| TW | 201644313 A | 12/2016 |
| WO | 2008/146380 A1 | 12/2008 |

OTHER PUBLICATIONS

Korean Office Action dated Jul. 9, 2020, in corresponding Korean Patent Application No. 10-2019-7027740.

International Search Report and Written Opinion dated Jun. 27, 2017 for PCT/JP2017/012852 filed on Mar. 29, 2017, 7 pages including English Translation of the International Search Report.

Examination opinion notification of Taiwan application No. 107109846 dated Apr. 16, 2019, 32 pages including English Translation.

Notification of reasons for refusal received for Japanese Patent Application No. 2019-508417, dated Jun. 11, 2019, 6 pages including English Translation.

* cited by examiner

FIG.1
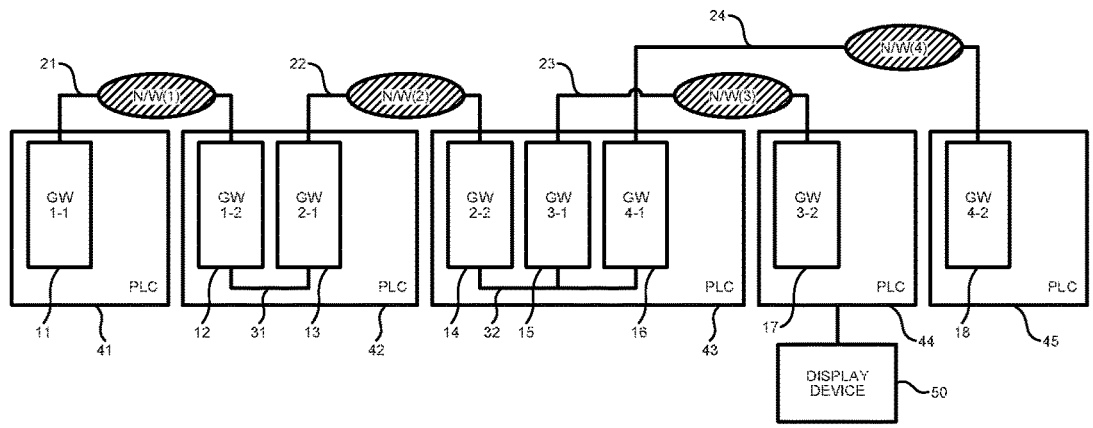
FIG.2
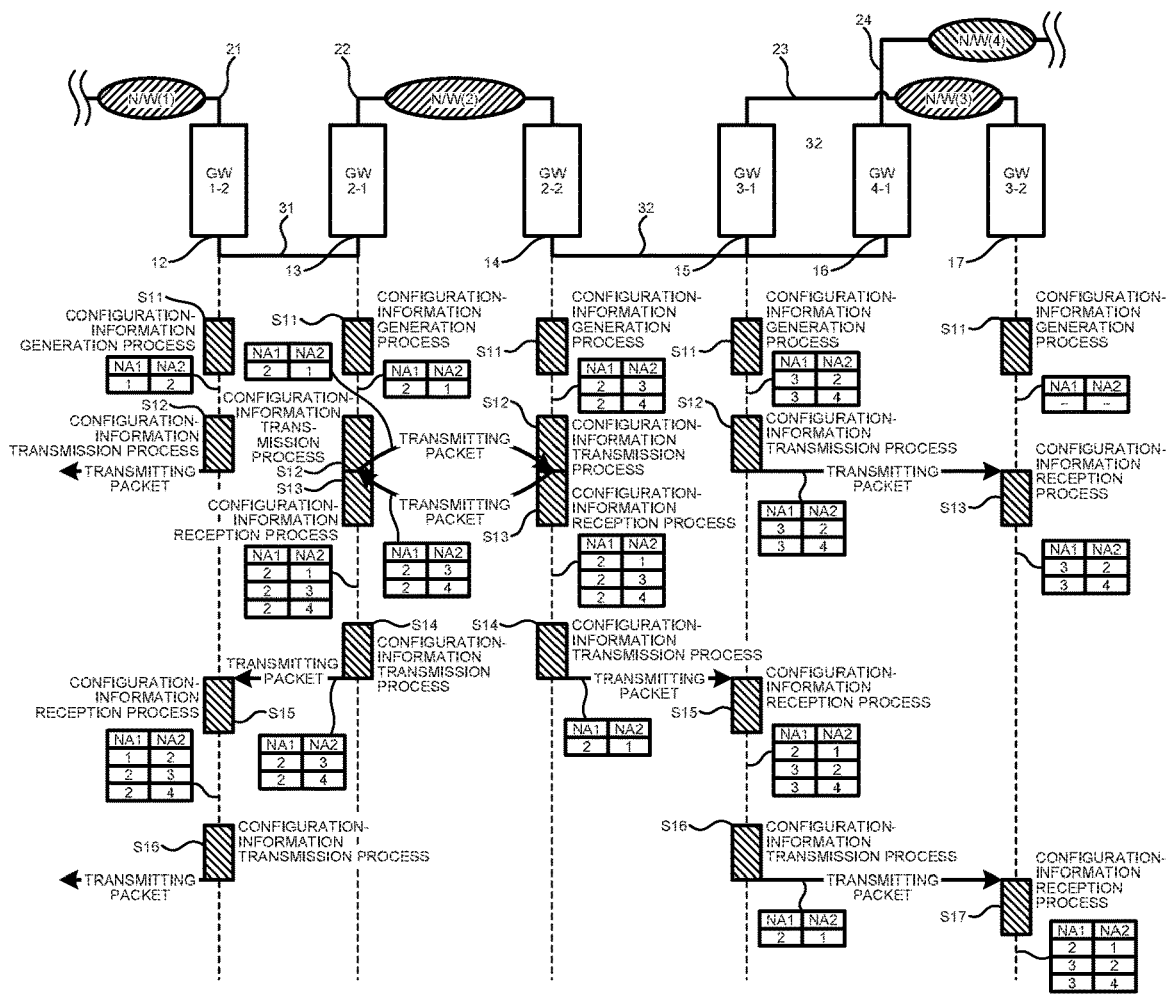
FIG.3

AFTER PERFORMING S21 TO S22

AFTER PERFORMING S23 TO S26 (FIRST TIME)

AFTER PERFORMING S23 TO S26 (SECOND TIME)

NETWORK-CONFIGURATION-INFORMATION GENERATION METHOD AND COMMUNICATION DEVICE

CROSS-REFERENCE TO RELATED APPLICATIONS

The present application is based on PCT filing PCT/JP2017/012852, filed Mar. 29, 2017, the entire contents of which are incorporated herein by reference.

FIELD

The present invention relates to a method for generating information indicating a connection relation between a plurality of networks of a system.

BACKGROUND

Some methods for generating network-configuration information in a system defined by a plurality of networks have been heretofore proposed.

For some proposed method in a control system having a plurality of programmable logic controllers (PLCs) connected to one another via networks, network-configuration information and online connection paths are collected from the PLCs and, on the basis of the collected information, a connection relation between the networks is calculated (for example, see Patent Literature 1). For another similar proposed method in a system in which a plurality of PLCs are connected via communication units to communication networks connected in a hierarchical structure, the type and the station number of each communication unit and the type of each programmable controller are determined via the communication networks, thereby calculating a connection relation between the networks (for example, see Patent Literature 2).

CITATION LIST

Patent Literatures

Patent Literature 1: International Publication No. WO2008/146380
Patent Literature 2: Japanese Patent Application Laid-open No. H4-32905

SUMMARY

Technical Problem

For a conventional network-configuration-information generation method, unfortunately, network information is generated in a PLC main body in accordance with an instruction from an external terminal, which results in a problem of a large processing load on a main CPU unit of the PLC main body.

The present invention has been achieved in view of the above, and an object of the present invention is to allow a communication device to predominately generate information indicating a connection relation between a plurality of networks of a system.

Solution to Problem

To achieve the above object, the present invention provides a network-configuration-information generation method for generating information indicating a network configuration of a network system defined by a plurality of communication devices and a plurality of networks, the method comprising: a step in which at least one of the communication devices generates and stores network-configuration information, the network-configuration information being defined as a pair of a network name of a network to which the at least one communication device belongs and a network name of a network adjacent to the network to which the at least one communication device belongs; and a step in which when each communication device receives, from another communication device, the network-configuration information stored in the other communication device, each communication devices stores the received network-configuration information.

Advantageous Effects of Invention

According to the present invention, it is possible for the communication devices to predominately cooperate with one another for generating the information indicating a connection relation between the networks.

BRIEF DESCRIPTION OF DRAWINGS

FIG. 1 is a diagram illustrating a configuration example of a communication system according to an embodiment.

FIG. 2 is an operation sequence diagram according to the embodiment.

FIG. 3 is a diagram illustrating an example of a network-configuration-information management table according to the embodiment.

DESCRIPTION OF EMBODIMENTS

Figure 4:
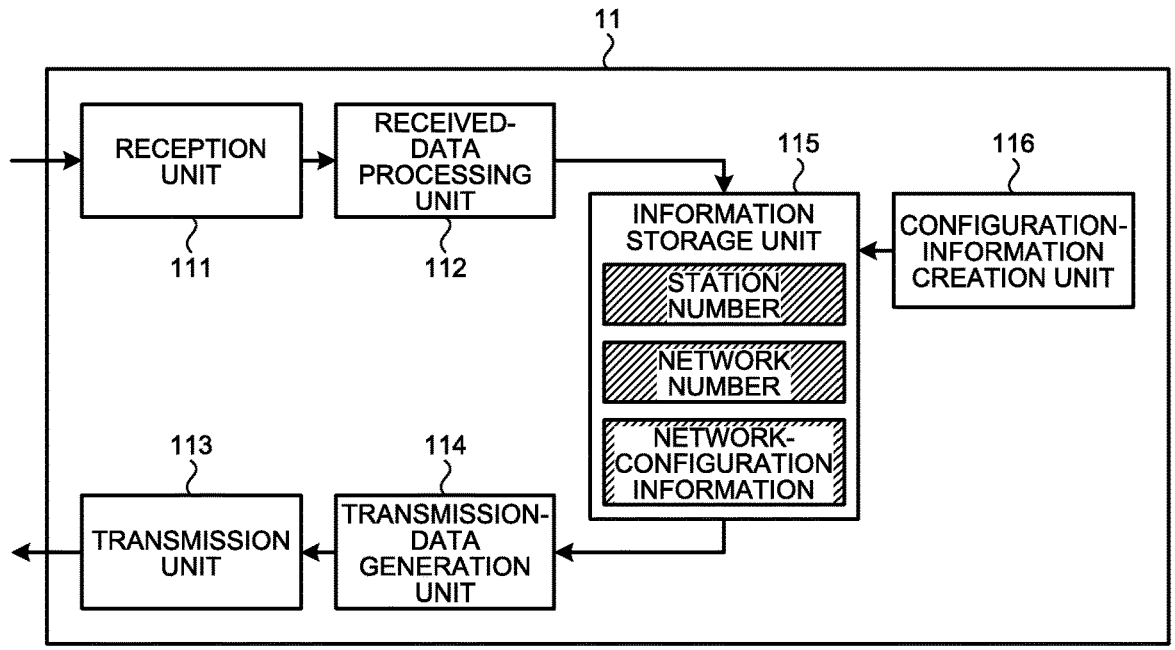
FIG. 4 is a block diagram illustrating a functional configuration of a gateway unit according to the embodiment.

An embodiment of a network-configuration-information generation method according to the present invention will be described below in detail with reference to the accompanying drawings. The present invention is not limited to the embodiment.

Embodiment

FIG. 1 illustrates a configuration example of a network system according to an embodiment of the present invention. A PLC 41 includes a gateway unit 11. A PLC 42 includes gateway units 12 and 13. A PLC 43 includes gateway units 14, 15, and 16. A PLC 44 includes a gateway unit 17. A PLC 45 includes a gateway unit 18. In addition to the gateway unit, each PLC includes a combination of a plurality of units such as a power unit, a CPU unit that controls the entire PLC, a motion unit for executing positioning control on an object to be driven, and an input/output unit that takes in or outputs a voltage/current signal. Further, a display device 50 is connected to a PLC 44. The display device 50 is a device for displaying and editing setting information of the PLC 44 and the other PLCs 41, 42, 43, and 45 connected via network lines to the display device 50.

The gateway units 11 to 18 of the PLCs 41 to 45 are connected to one another via network lines 21 to 24. The gateway unit 12 and the gateway unit 13 are connected to each other via a bus 31. The gateway unit 14, the gateway unit 15, and the gateway unit 16 are connected to one another via a bus 32. Although not illustrated, plural units of each PLC are connected via a bus to one another.

Each gateway unit, belongs to a network, is assigned an identification number (a network number) of the corresponding network. Each gateway is also assigned its own identification number (a station number). In FIG. 1, numerical values appearing in the block denoting the gateway unit represent a network number and a station number respectively assigned to the gateway unit. For example, "2-1" appearing in the block denoting the gateway unit 13 indicates that network number "2" and station number "1" are assigned to the gateway unit 13. Gateway units connected to one another via one of the network lines 21 to 24 is assigned the same network number. Meanwhile, gateway units connected to one another via one of the buses 31 and 32 are assigned different network numbers. A gateway unit is an example of a communication device in the present specification. The communication device in the present specification is not limited to a gateway unit that is one of units that define a PLC. For example, a part of the communication device may be an independent gateway device that is connected to a PLC via a network line only. Further, although a PLC network is described in the present embodiment, the present invention can be also applied to another network system that does not include a PLC. Although the present embodiment uses an identification number (a network number) as information for identifying a network, the information for identification may be represented by other characters or symbols instead of a number. The present specification uses a term "network name", including the number and the other characters or symbols.

Each of the network lines 21 to 24 is an Ethernet® line or an RS-232/422 line, for example. Further, all the network lines 21 to 24 are not necessarily the same type of network lines. The network lines 21 to 24 may be different types of network lines. For example, both the network line 21 and the network line 22 may be an Ethernet® line, or a combination may be employed in which the network line 21 is an Ethernet® line and the network line 22 is an RS-232 line.

The bus, which includes the buses 31 and 32, for interconnecting a plurality of units that define each PLC is a backplane or a system bus for interconnecting physically adjacent devices, and is configured using a communication standard such as SATA or PCI Express. The abovementioned bus including the buses 31 and 32 is also termed "internal bus" in the present specification, because the bus interconnects the units that define each PLC.

FIG. 2 is a sequence diagram illustrating an operation related to generation of network-configuration information in the embodiment of the present invention. An operation sequence until pieces of network-configuration information on the entire network system are collected in the gateway unit 17 is described with reference to FIG. 2.

First, when each gateway unit is activated, a process for generating network-configuration information is started, such that each gateway unit performs a configuration-information generation process for collecting, from another gateway unit connected thereto via a bus within the corresponding PLC, information on a network to which the other gateway unit belongs, thereby generating information indicating a connection relation between the networks (network-configuration information) (S11).

The network-configuration information is defined as a pair of: a network number 'NA1' of a network that acts as a base network; and a network number 'NA2' of a network adjacent to the base network. In the present specification, a relation in which networks are adjacent to each other means a relation between different networks to which different communication devices connected to one another via a bus (an internal bus) belong. For the configuration in FIG. 1, the gateway units 14, 15, and 16 are connected to one another via the bus 32 and the communication devices 14, 15, and 16 belong to second, third, and fourth networks, respectively. Therefore, the second, third, and fourth networks are the networks adjacent to one another. The network-configuration information is configured in such a manner that NA1 indicates a network number of the closer one of the adjacent networks to the gateway unit serving as the reference gateway unit managing the network information, and NA2 indicates a network number of the farther one from the reference gateway unit.

In the configuration-information generation process (S11), each gateway unit generates the network-configuration information NA1 and NA2: NA1 indicates a network number of a network to which the gateway unit belongs; and NA2 indicates a network number of a network adjacent to that network having its network number indicated by NA1, such that each gateway unit stores the pair of NA1 and NA2 in a table (a network-configuration-information management table) that manages the network-configuration information of that gateway unit. If there is no information on a network adjacent to the network to which a gateway unit belongs, for example, if there is no gateway unit connected via a bus to such a gateway unit, the network-configuration information is blank.

For example, the gateway unit 13 belongs to a network having network number 2, and a network having network number 1 is adjacent to that network having network number 1. Therefore, network-configuration information (NA1, NA2) generated in the configuration-information generation process and stored in a network-configuration-information management table of the gateway unit 13 is (2, 1). The gateway unit 14 belongs to the network having network number 2 adjacent to networks having network numbers 3 and 4. Therefore, network-configuration information (NA1, NA2) generated and stored in a network-configuration-information management table of the gateway unit 14 is (2, 3) and (2, 4). Further, the gateway unit 15 belongs to the network having network number 3 adjacent to the networks having the network numbers 2 and 4. Therefore, network-configuration information (NA1, NA2) generated and stored in a network-configuration-information management table of the gateway unit 15 is (3, 2) and (3, 4). The gateway unit 17 belonging to the network having network number 3 cannot obtain information on a network adjacent thereto at S11. As a result, network-configuration information is not generated and a network-configuration-information management table is blank.

Next, a gateway unit performs a configuration-information transmission process (S12) for transmitting generated network-configuration information to another gateway unit. In the configuration-information transmission process, each gateway unit transmits network-configuration information generated in the configuration-information generation process, to another gateway unit on a network line.

For example, the gateway unit 13 stores generated network-configuration information in transmission data, and transmits the transmission data to the gateway unit 14 that is another device on a network line (the gateway unit 13 does not transmit the transmission data to the gateway unit 12 that is another device connected via a bus). Meanwhile, the gateway unit 15 stores generated network-configuration information in transmission data, and transmits the transmission data to the gateway unit 17 that is another device on a network line. The gateway unit 14 transmits generated network-configuration information to the gateway unit 13. Further, although not illustrated, the gateway units 16 and 12 transmit generated network-configuration information to the gateway units 18 and 11, respectively. On the other hand, no network-configuration information has been generated in the gateway unit 17; therefore, transmission of network-configuration information to the gateway unit 15 is not performed.

Upon receiving data transmitted from another gateway unit in the configuration-information transmission process (S12), each gateway unit performs a configuration-information reception process (S13) in order to extract network-configuration information stored in received data and store the extracted network-configuration information. In the configuration-information reception process, each gateway unit first extracts network-configuration information stored in received data, and then adds the extracted network-configuration information to a network-configuration-information management table managed on its own.

For example, the gateway unit 14 receives, from the gateway unit 13, network-configuration information (NA1, NA2) that is (2, 1). As a result, the network-configuration information (NA1, NA2) stored in the network-configuration-information management table of the gateway unit 14 is (2, 1), (2, 3), and (2, 4). The gateway unit 17 receives, from the gateway unit 15, network-configuration information (NA1, NA2) that is (3, 2) and (3, 4). As a result, the network-configuration information (NA1, NA2) stored in the network-configuration-information management table of the gateway unit 17 is (3, 2) and (3, 4).

Each gateway unit that has completed the configuration-information reception process stores, in a transmitting packet, network-configuration information received in the configuration-information reception process, and transmits the packet to another gateway unit via a bus (S14). It is noted that only when receiving new network-configuration information in the immediately preceding configuration-information reception process (S13), each gateway unit transmits the network-configuration information to another gateway unit. This means that when not receiving new network-configuration information, the gateway unit does not transmit the network configuration information to another gateway unit. Further, When network-configuration information is about to be transmitted to a gateway unit, but is already retained by such a gateway unit, it is unnecessary to transmit such information. It is preferable not to transmit such unnecessary information, because the transmission of no unnecessary information can reduce transmission traffic.

For example, the gateway unit 14 transmits, to the gateway units 15 and 16 via the bus 32, (2, 1) that is network-configuration information (NA1, NA2) received from the gateway unit 13 at S13 that is an immediately preceding step. Further, the gateway unit 13 transmits, to the gateway unit 12 via the bus 31, (2, 3) and (2, 4) that are network-configuration information (NA1, NA2) received from the gateway unit 14 at S13 that is an immediately preceding step. Meanwhile, the gateway unit 15 receives no network-configuration information from the gateway unit 17 in the immediately preceding configuration-information reception process (S13); therefore, the gateway unit 15 does not transmit network-configuration information.

Subsequently, a gateway unit that has received network-configuration information performs the configuration-information reception process, stores the received network-configuration information in a transmitting packet, and transmits the transmitting packet to another gateway unit (S15 and S16) in the same manner as discussed above. As is stated above, only when receiving new network-configuration information, each gateway unit transmits the information to another gateway unit. It is not necessary to transmit information if such information is already retained by a gateway unit that would otherwise receive the information. It is preferable not to transmit such information.

For example, the gateway unit 15 transmits, to the gateway unit 17 via the network line 23 in a configuration-information transmission process (S16), (2, 1) that is network-configuration information (NA1, NA2) received from the gateway unit 14 in a configuration-information reception process (S15). Of the network-configuration information retained by the gateway unit 15, (3, 2) and (3, 4) that are network-configuration information (NA1, NA2) are information already retained by the gateway unit 17. It is therefore not necessary to transmit the information (3,2) and (3,4) to the gateway unit 17.

Subsequently, a process for transmitting new network-configuration information to another gateway unit on a bus upon receiving the new network-configuration information from a network line is performed while a process for transmitting new network-configuration information to another gateway unit on a network line upon receiving the new network-configuration from a bus is performed. These processes are repeated until there is no longer new information to be transmitted.

For example, there is no gateway unit connected to the gateway unit 17 via a bus. Therefore, after a configuration-information reception process (S17), a process of transmission to another gateway unit is not performed. Further, in the configuration of the present embodiment, transmission of network-configuration information to the gateway unit 17 is not performed after the configuration-information reception process (S17), such that the network-configuration-information management table is completed in the configuration-information reception process (S17).

FIG. 3 is a network-configuration-information management table retained by the gateway unit 17 after completion of the configuration-information reception process (S17) in the gateway unit 17.

FIG. 4 is a block diagram illustrating a functional configuration of a gateway unit in the communication system in FIG. 1. In FIG. 4, the gateway unit 11 includes a reception unit 111, a received-data processing unit 112, a transmission unit 113, a transmission-data creation unit 114, an information storage unit 115, and a configuration-information creation unit 116.

The configuration-information creation unit 116 generates network-configuration information, and registers the generated network-configuration information in a network-configuration-information management table retained by the information storage unit 115.

The received-data processing unit 112 of the gateway unit 11 analyzes data received from the reception unit 111. The received-data processing unit 112 extracts network-configuration information from the received data, and registers the extracted network-configuration information in the network-configuration-information management table retained by the information storage unit 115.

In order for the gateway unit 11 to transmit data, first, the transmission-data creation unit 114 creates transmission data. The transmission-data creation unit 114 reads out network-configuration information stored in the information storage unit 115 and stores the information in the generated transmission data. The transmission unit 113 then transmits the created transmission data.

Figure 5:
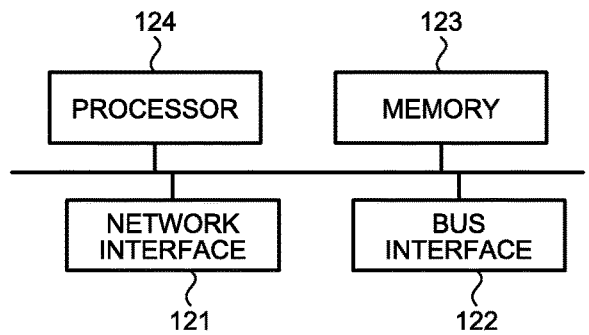
FIG. 5 is a diagram illustrating a hardware configuration of the gateway unit according to the embodiment.

FIG. 5 is a diagram illustrating a hardware configuration of the gateway unit 11 illustrated in FIG. 4. The gateway unit 11 can be implemented using a network interface 121, a bus interface 122, a memory 123, and a processor 124. The network interface 121 is a communication interface for connection to an external device via a network line. The bus interface 122 is a communication interface for connection to another unit of a PLC via a bus. The memory 123 is a storage unit that stores therein a computer program such as software and firmware. The processor 124 is a processing circuit that reads out and executes a computer program stored in the memory 123. The memory 123 is a nonvolatile or volatile semiconductor memory such as a RAM (Random Access Memory), a ROM (Read Only Memory), a flash memory, and a magnetic disk, or the like. The processor 124 is a CPU (Central Processing Unit), a processing device, a calculation device, a microprocessor, a microcomputer, a DSP (Digital Signal Processor), or the like.

The function of the reception unit 111 of the gateway unit 11 and the function of the transmission unit 113 are implemented by the network interface 121 or the bus interface 122. The functions of the received-data processing unit 112 and the transmission-data creation unit 114 of the gateway unit 11 are implemented by the processor 124 executing a procedure described in a computer program. Further, the function of the information storage unit 115 of the gateway unit 11 is implemented by the memory 123.

Figure 6:
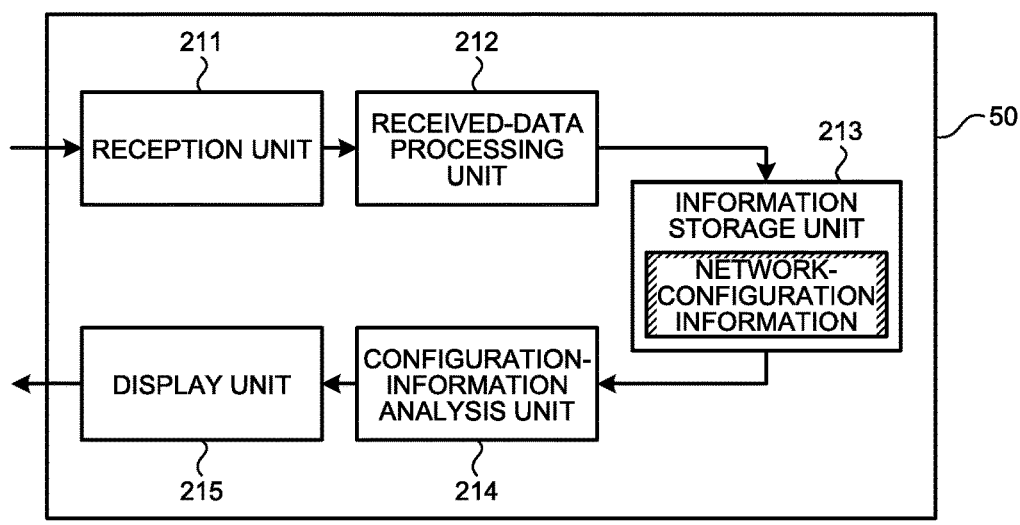
FIG. 6 is a block diagram illustrating a functional configuration of a display device according to the embodiment.

FIG. 6 is a block diagram illustrating a functional configuration of the display device 50 for displaying a network-configuration-information diagram. In FIG. 6, the display device 50 includes a reception unit 211, a received-data processing unit 212, an information storage unit 213, a configuration-information analysis unit 214, and a display unit 215.

The received-data processing unit 212 of the display device 50 analyzes data received from the reception unit 211. The received-data processing unit 212 extracts network-configuration information from the received data, and registers the extracted network-configuration information in a network-configuration-information management table retained by the information storage unit 213.

The configuration-information analysis unit 214 reads out the network-configuration information stored in the information storage unit 213, analyzes the content of the read information, and draws a network-configuration diagram on the display unit 215.

Figure 7:
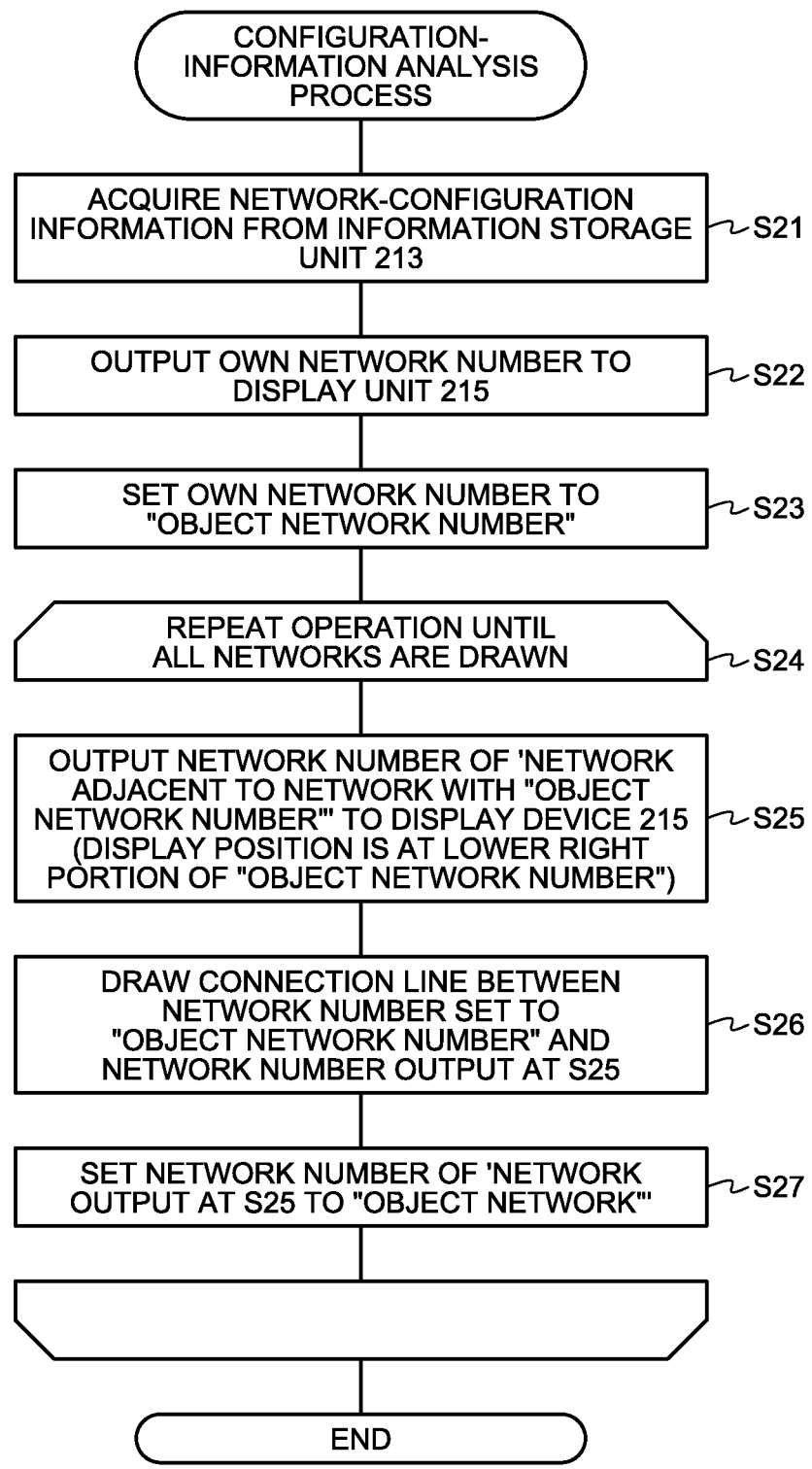
FIG. 7 is a diagram illustrating a flowchart of an operation of a configuration-information analysis unit according to the embodiment.

FIG. 7 is a diagram illustrating a flowchart of an operation of a configuration-information analysis process in the configuration-information analysis unit 214. First, network-configuration information is acquired from the information storage unit 213 (S21).

Next, the own network number is drawn on an upper-left portion of the display unit 215 (S22), and the own network number is set to an "object network number" (S23).

Thereafter, a network number of a 'network adjacent to a network having the "object network number"' is drawn on the display unit 215 (the display position being a lower-right portion of a network of the "object network number") (S25). A connection line is then drawn between the network number set to the "object network number" and the network number drawn at S25 (S26).

After the connection line is drawn, the network number of the 'network drawn at S25' is set to the "object network" (S27). Subsequently, operations at S25 to S27 are repeated until all networks are drawn (S24).

Figure 8:
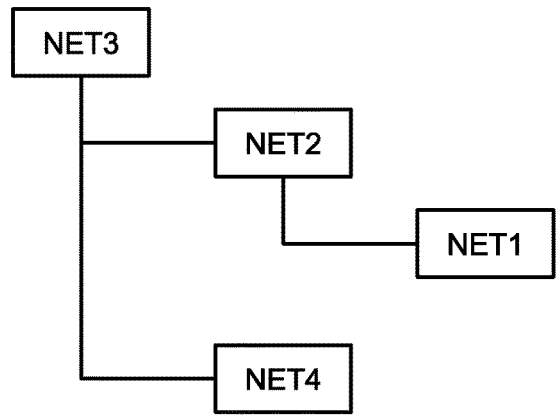
FIG. 8 is a display example of a network-configuration diagram according to the embodiment.

FIG. 8 is a diagram illustrating an example of generating a network-configuration diagram in the communication system in FIG. 1. Drawing lines from 'NET3' to 'NET2' and 'NET4' in FIG. 8 indicates that a network having network number 3 is adjacent to a network having network number 2 and a network having network number 4. Drawing a line from 'NET2' to 'NET1' indicates that the network having network number 2 is adjacent to a network having network number 1.

Figure 9A:
FIG. 9A is a diagram illustrating a process for generating the network-configuration diagram according to the embodiment.
Figure 9B:
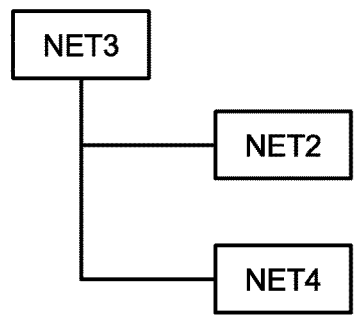
FIG. 9B is a diagram illustrating a process for generating the network-configuration diagram according to the embodiment.
Figure 9C:
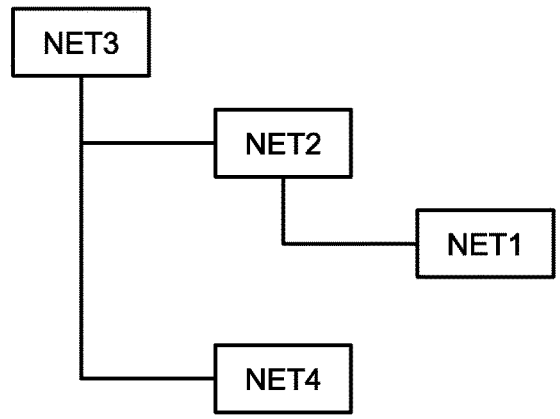
FIG. 9C is a diagram illustrating a process for generating the network-configuration diagram according to the embodiment.

FIGS. 9A, 9B, and 9C are diagrams illustrating a sequence of operations for generating the network-configuration diagram in FIG. 8 from the network-configuration-information management table in FIG. 3. First, 'NET3' that represents a network number 3 that is a network number of its own network is drawn, as illustrated in FIG. 9A. Next, 'NET2' representing a network number 2 and 'NET4' representing a network number 4 are drawn as being connected to 'NET3' via lines as illustrated in FIG. 9B, because it is found from the network-configuration-information management table that networks having network numbers 2 and 4 are adjacent to the network having network number 3. Finally, 'NET1' representing a network number 1 is drawn as being connected to 'NET2' via a line as illustrated in FIG. 9C, because it is found from the network-configuration-information management table that a network having network number 1 is adjacent to the network having network number 2.

In the configuration described in the present embodiment, activation of each gateway unit provides a trigger to start a process for generating network-configuration information, such that a network-configuration-information management table of each gateway unit is completed. With this configuration, it is possible to obtain information that describes a network configuration of the entire system quickly, as compared to a case where a request from outside acts as a trigger to start generating the network-configuration information.

Meanwhile, generation of network-configuration information may be started using a request from outside as a trigger. This case is also largely advantageous over a conventional technique, because the amount of communication is suppressed, for example.

The configuration of the present embodiment allows the gateway units to predominately cooperate with one another for generating information indicating a network configuration of the entire system. As a result, a load on a CPU unit can be also reduced.

The configurations described in the above embodiment are only examples of the content of the present invention. The configurations can be combined with other well-known techniques, and a part of each configuration can be omitted or modified without departing from the scope of the present invention.

INDUSTRIAL APPLICABILITY

As described above, the network-configuration-information generation method according to the present invention is suitable for a network system that uses a plurality of communication devices.

REFERENCE SIGNS LIST 11 to 18 gateway unit (communication device), 21 to 24 network line, 31, 32 bus, 41 to 45 PLC, 50 display device, 111 reception unit, 112 received-data processing unit, 113 transmission unit, 114 transmission-data creation unit, 115 information storage unit, 116 configuration-information creation unit, 121 network interface, 122 bus interface, 123 memory, 124 processor, 211 reception unit, 212 received-data processing unit, 213 information storage unit, 214 configuration-information analysis unit, 215 display unit.

The invention claimed is:

1. A network-configuration-information generation method for generating information indicating a network configuration of a network system defined by a plurality of networks, and a plurality of programmable logic controllers each including one or more than one communication device, the more than one communication device being connected to each other by a bus within the corresponding programmable logic controller, the method comprising:
connecting each of the communication devices to one of the plurality of networks, and the networks connected to communication devices that are connected by a same bus within a programmable logic controller being defined as adjacent networks;
generating and storing network-configuration information, the network-configuration information being defined as a pair of a network name of a network to which at least one communication device belongs and a network name of a network adjacent to the network to which the at least one communication device belongs; and
storing the received network-configuration information when each of the communication devices receives, from another one of the communication devices, the network-configuration information stored in the other communication device.

2. The network-configuration-information generation method according to claim 1, wherein the communication devices include a communication device belonging to one of the networks adjacent to each other, and a communication device belonging to one of the networks that is adjacent to no network, and wherein, generating and storing the network-configuration information comprises allowing the communication device belonging to the one of the networks adjacent to each other to generate and store the network-configuration information, and allowing the communication device belonging to the one of the networks that is adjacent to no network not to generate network-configuration information.

3. The network-configuration-information generation method according to claim 1, wherein each of the communication devices receiving the network-configuration information from the other communication device includes a communication device connected via a network or a bus to a communication device other than the other communication device, and wherein the communication device connected via the network or the bus to the communication device other than the other communication device transmits the network-configuration information to the communication device connected via the network or the bus thereto.

4. A network-configuration-information generation method for generating information indicating a network configuration of a network system defined by a plurality of networks, and a plurality of programmable logic controllers each including one or more than one communication device, the more than one communication device being connected to each other by a bus within the corresponding programmable logic controller, the method comprising:
connecting each of the communication devices to one of the plurality of networks, and the networks connected to communication devices that are connected by a same bus within a programmable logic controller being defined as adjacent networks;
generating network-configuration information, the network-configuration information being defined as a pair of a network name of a network to which a first communication device belongs and a network name of a network adjacent to the network to which the first communication device belongs; and
transmitting the network-configuration information to a second communication device via the network to which the first communication device belongs.

5. The network-configuration-information generation method according to claim 4, further comprising adding the received network-configuration information to a network-configuration-information management table managed by the second communication device.

6. The network-configuration-information generation method according to claim 4, further comprising transmitting the network-configuration information to a third communication device connected to the second communication device via an internal bus.

7. The network-configuration-information generation method according to claim 4, further comprising, when the first communication device receives additional network-management information from the second communication device via the network to which the first communication device belongs, transmitting the additional network-management information to a third communication device connected to the adjacent network.

8. A communication device in a programmable logic controller, the communication device comprising:
a bus interface configured to connect the communication device to at least one other communication device within the programmable logic controller using a same internal bus that is internal to the programmable logic controller; and
a network interface, wherein
the communication device is connected to a first other communication device within the programmable logic controller via the bus interface and is connected to a network via the network interface, wherein the communication device transmits network-configuration information to a second other communication device not in the programmable logic controller and connected to the communication device via the network interface, and
the network-configuration information is defined as a pair of a network name of a network to which the first other communication device is connected and a network name of the network connected to the communication device via the network interface.

9. The communication device according to claim 8, wherein, when the communication device receives additional network-management information from the second other communication device connected thereto via the network interface, the communication device transmits the network-configuration information to the first other communication device connected thereto via the bus interface.

10. The communication device according to claim 8, further comprising a memory to store therein the network-configuration information.

11. The communication device according to claim 8, wherein the communication device is a gateway of a programmable logic controller.

12. A communication device in a programmable logic controller, the communication device comprising:
a bus interface configured to connect the communication device to at least one other communication device within the programmable logic controller using a same internal bus that is internal to the programmable logic controller; and
a network interface, wherein
the communication device is connected to a first other communication device not in the programmable logic device via the network interface, wherein
when the communication device receives network-configuration information from the first other communication device, the communication device transmits the network-configuration information to a second other communication device within the programmable logic controller and connected to the communication device via the bus interface, and
the network-configuration information is defined as a pair of a network name of a network to which the first other communication device is connected and a network name of a network adjacent to the network.

13. The communication device according to claim 12, further comprising a memory to store therein network-configuration information.

14. The communication device according to claim 12, wherein the communication device is a gateway of a programmable logic controller.

15. The network-configuration-information generation method according to claim 1, wherein by generating and storing the network-configuration information and storing the received network-configuration information, each of the communication devices to collect the network-configuration information defined as the pair of the network names of the networks adjacent to each other, and acquire information indicating the network configuration of the entire network system.

16. The network-configuration-information generation method according to claim 1, wherein the more than one communication device within the programmable logic controller each belong to a different network in the plurality of networks.

* * * * *